(12) United States Patent
Boljanovic

(10) Patent No.: US 6,909,571 B2
(45) Date of Patent: Jun. 21, 2005

(54) METHOD AND APPARATUS ACTIVELY DAMPING MECHANICAL VIBRATION AND SHOCK IN HEAD SUSPENSIONS OF A DISK DRIVE

(75) Inventor: Momo Boljanovic, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 292 days.

(21) Appl. No.: 10/294,326

(22) Filed: Nov. 14, 2002

(65) Prior Publication Data

US 2004/0095670 A1 May 20, 2004

(51) Int. Cl.[7] .......................... G11B 5/596; G11B 21/10
(52) U.S. Cl. ....................................... 360/75; 360/78.05
(58) Field of Search .............................. 360/75, 77.03, 360/78.05, 78.12, 244.2, 294.4

(56) References Cited

U.S. PATENT DOCUMENTS

| | | | | | |
|---|---|---|---|---|---|
| 5,862,015 | A | * | 1/1999 | Evans et al. ................. | 360/75 |
| 6,100,623 | A | * | 8/2000 | Huang et al. ............... | 310/317 |
| 6,310,746 | B1 | * | 10/2001 | Hawwa et al. ............ | 360/244.2 |
| 6,501,625 | B1 | * | 12/2002 | Boismier et al. ......... | 360/294.7 |
| 6,621,653 | B1 | * | 9/2003 | Schirle ..................... | 360/78.12 |
| 6,667,844 | B1 | * | 12/2003 | Yao et al. .................... | 360/75 |
| 6,744,577 | B1 | * | 6/2004 | Guo et al. .................... | 360/75 |
| 6,757,124 | B2 | * | 6/2004 | Kelemen .................... | 360/75 |
| 6,760,180 | B2 | * | 7/2004 | Kino et al. .................. | 360/75 |
| 2002/0122267 | A1 | * | 9/2002 | Morioka ..................... | 360/75 |
| 2003/0011914 | A1 | * | 1/2003 | Angelo et al. .............. | 360/75 |

OTHER PUBLICATIONS

Huang et al., Active Damping in HDD Actuator, IEEE Transaction on Magnetics, Mar. 2001, 3 pages, vol. 2, No. 2.

* cited by examiner

Primary Examiner—David Hudspeth
Assistant Examiner—James L Habermehl
(74) Attorney, Agent, or Firm—Gregory Smith & Associates; Jeffrey Aiello; Earle Jennings

(57) ABSTRACT

The invention includes a method of attenuating resonance frequency modes in head suspensions, which does not significantly increase the weight of the head suspension. The invention provides a way to control the head deflection from the disk surface, which helps minimize damage from head slapping. The invention includes a basic head suspension infrastructure for which vibration resonance can be predictably controlled.

27 Claims, 6 Drawing Sheets

METHOD AND APPARATUS ACTIVELY DAMPING MECHANICAL VIBRATION AND SHOCK IN HEAD SUSPENSIONS OF A DISK DRIVE

TECHNICAL FIELD

This invention relates to reducing mechanical vibration and shock in the head suspensions of a disk drive to improve reliability.

BACKGROUND ART

Disk drives are an important data storage technology. Read-write heads are one of the crucial components of a disk drive, directly communicating with a disk surface containing the data storage medium. The invention relates to actively compensating for mechanical strains on the infrastructure holding the read-write head close to the disk surface.

FIG. 1A illustrates a typical prior art high capacity disk drive 10 including actuator 30 with voice coil 32, actuator axis 40, actuator arms 50–58 with head gimbal assembly 60 placed among the disks.

FIG. 1B illustrates a typical prior art high capacity disk drive 10 with head stack assembly 20 including actuator 30 with voice coil 32, actuator axis 40, actuator arms 50–56 and head gimbal assemblies 60–66 with the disks removed.

FIG. 2A illustrates a head gimbal assembly including head suspension assembly 60 with head slider 100 containing the read-write head 200 of the prior art.

Since the 1980's, high capacity disk drives 10 have used voice coil actuators 20–66 to position their read-write heads over specific tracks. The heads 200 are mounted on head sliders 100, which float a small distance off the disk drive surface when in operation. The flotation process is referred to as an air bearing. The air bearing is formed by the read-write heads 200, illustrated in FIGS. 2A, and slider 100, as illustrated in FIGS. 1A–2A.

Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electro-magnetic field induced by voice coil 32 to provide a lever action via actuator axis 40. The lever action acts to move actuator arms 50–56, positioning head gimbal assemblies 60–66, and their associated sliders 100 containing read-write heads 200, over specific tracks with speed and accuracy. Actuators 30 are often considered to include voice coil 32, actuator axis 40, actuator arms 50–56 and head gimbal assemblies 60–66. An actuator 30 may have as few as a single actuator arm 50. A single actuator arm 52 may connect with two head gimbal assemblies 62 and 64, each with at least one head slider.

FIG. 2B illustrates the relationship between the principal axis 110 of an actuator arm 50 containing head gimbal assembly 60, which in turn contains slider 100, as found in the prior art.

FIG. 2C illustrates a simplified schematic of a disk drive controller 1000 of the prior art. Disk drive controller 1000 controls an analog read-write interface 220 communicating resistivity found in the spin valve within read-write head 200. Disk drive controller 1000 concurrently controls servo-controller 240 driving voice coil 32, of the voice coil actuator, to position read-write head 200 to access a rotating magnetic disk surface 12 of the prior art.

Analog read-write interface 220 frequently includes a channel interface 222 communicating with pre-amplifier 224. Channel interface 222 receives commands, from embedded disk controller 1000, setting at least the read_bias and write_bias.

Various disk drive analog read-write interfaces 220 may employ either a read current bias or a read voltage bias. By way of example, the resistance of the read head is determined by measuring the voltage drop ($V\_rd$) across the read differential signal pair (r+ and r−) based upon the read bias current setting read_bias, using Ohm's Law.

FIG. 2D illustrates a detailed view head suspension 60 of the prior art.

A prior art head suspension 60 includes suspension load beam 80 mechanically coupled via hinge 82 with extended base plate 84. Head suspension 60 further includes flexure 86, providing electrical interconnections of the read and write differential signal pairs 210, between the disk drive analog interface 220 and read-write head 200 (both in FIG. 2C).

The head gimbal assembly includes head slider 100 rigidly mounted on head suspension 60, with read-write head 200 electrically connected to flexure 86. Head slider 100 is mounted over the right portion of suspension load beam 80 so that read-write head 200 makes contact with flexure 86.

The hinge 82 includes a spring mechanism. Suspension load beam 80, hinge 82 and extended base plate 84 are all typically made from stainless steel. Flexure 86 is a flex printed circuit typically made using polyimide and copper traces.

Both the actuator as a whole and head suspension 60 experience mechanical shock and vibration. However, they do not experience the same shocks and vibrations.

A voice coil actuator, once aligned close to the disk surfaces being accessed, basically has one mechanical degree of freedom, swinging across the plane of the disk, as in FIG. 2B.

By contrast, head suspension 60 faces two mechanical degrees of stress, both vertically in terms of distance from the disk surface 12, as well as, horizontally from the actuator swinging as a whole. The head suspension is trying to maintain a flying height for the slider 100 very close to the disk surface 12, which is rotating at many thousands of RPMs. The suspension mechanism weighs at most a few percent of what an actuator assembly weighs. Any mechanical forces an actuator imparts to a head suspension affect it greatly.

As the actuator swings back and forth seeking different tracks above the rapidly rotating disk surface, the suspension experiences severe mechanical vibrations. The suspension is at the far end of the actuator arm from the pivot and close to the rotating disk surface. The actuator frequently whips the suspension back and forth as it seeks various tracks.

As the move to greater Tracks-Per-Inch continues, these mechanical affects on the head suspension grow in significance. There is increasing need to control suspension resonance.

What is needed is a method of attenuating resonance frequency modes in head suspensions.

Additionally, adding weight to the head suspension adversely affects the actuator as a whole in terms of positioning quickly and accurately above the disk tracks. What is further needed is a way to control resonance frequency modes in a head suspension, without adding any significant weight to the suspension mechanism.

Another problem disk drives face is head suspension shock. During non-operational shock, the read-write head experiences a mechanical shock when it slaps into the disk surface, known as "head slapping". Head slapping can be quite severe. There is no known practical way to avoid this problem.

What is needed is a way to control the deflection of head from the disk surface. Controlling the disk surface deflection helps minimize the damaging effects of head slapping.

Another problem is at the design phase. Today, modeling is used to predict resonance frequency modes for suspension designs on a component level. But disk drives are complex mechanical systems, which cannot be reliably modeled. This requires actually constructing alternative suspension designs, then assembling, and testing them in disk drives to fully determine the mechanical characteristics such as resonance frequency modes and shock performance.

Selecting a head suspension design must be done for specific disk drive configurations, because there is no way to control and/or predict system level mechanical resonance in these devices. Consequently, head suspension selection requires numerous repeated full systems mechanical tests to select a head suspension design. This is a very costly, time-consuming process.

What is needed is a basic head suspension infrastructure for which vibration resonance can be predictably controlled, minimizing the early system testing of the head suspension mechanism. This reduces the overall design cycle and time to market.

The inventor is aware of only one attempt to actively dampening mechanical vibration in any part of an actuator. In "Active Damping in HDD Actuator", by Huang, et. al., published March 2001, IEEE Transactions on Magnetics, pages 847–849, an active damping scheme was discussed using strain-type sensors located in the actuator, which provided feedback to control the voice coil of the actuator. Its purpose was to reduce vibration in the actuator's motion in the disk plane as illustrated in FIG. 2B. The approach does not directly help the head suspension's vibration and shock problems. Firstly, it does not sense them, and secondly, the article provided no indication of an active mechanism to dampen head suspension vibrations and shocks.

To summarize, what is needed is a method of attenuating resonance frequency modes in head suspensions, which further, does not significantly increase the weight of the head suspension. What is needed is a way to control the head deflection from the disk surface, which helps minimize damage from head slapping. What is needed is a basic head suspension infrastructure for which vibration resonance can be predictably controlled.

SUMMARY OF THE INVENTION

The invention addresses at least all problems and needs identified in the background.

The invention includes a method of operating the suspension load beam of a disk drive, whether or not the disk drive is in operation, comprising the following steps. At least two differential signals are provided from the suspension load beam indicating mechanical bending of the suspension load beam. Whenever the differential signals indicate mechanical bending, an out-of-phase electrical signal is sent back to the suspension load beam. The suspension load beam responds to the out-of-phase electrical signal(s) to attenuate the mechanical bending of the suspension load beam.

The invention preferably includes load suspension beams with a means for integrating at least two piezo fiber elements to provide the differential signals via corresponding conductors to a means for response, which is preferably a control circuit. The control circuit preferably uses a standby power supply when the disk drive is not in operation.

The preferred suspension load beam integrates the piezo fiber elements, capable of sensing mechanical bending in the suspension load beam, as well as responding to the out-of-phase electrical signal(s) to contract, dampening or attenuating the mechanical bending through their contraction.

The invention includes not only the suspension load beam with the means for indicating mechanical bending and attenuating it, but also head suspension assemblies, head gimbal assemblies, actuators and disk drives containing these suspension load beams. The disk drives preferably further include the means for responding to the differential signals indicating mechanical bending by generating the out-of-phase electrical signal(s) used by the suspension load beam to attenuate the bending.

These and other advantages of the present invention will become apparent upon reading the following detailed descriptions and studying the various figures of the drawings.

DETAILED DESCRIPTION OF THE INVENTION

The invention includes a method of attenuating resonance frequency modes in head suspensions, which does not significantly increase the weight of the head suspension. The invention provides a way to control the head deflection from the disk surface, which helps minimize damage from head slapping. The invention includes a basic head suspension infrastructure for which vibration resonance can be predictably controlled.

Figure 1A:
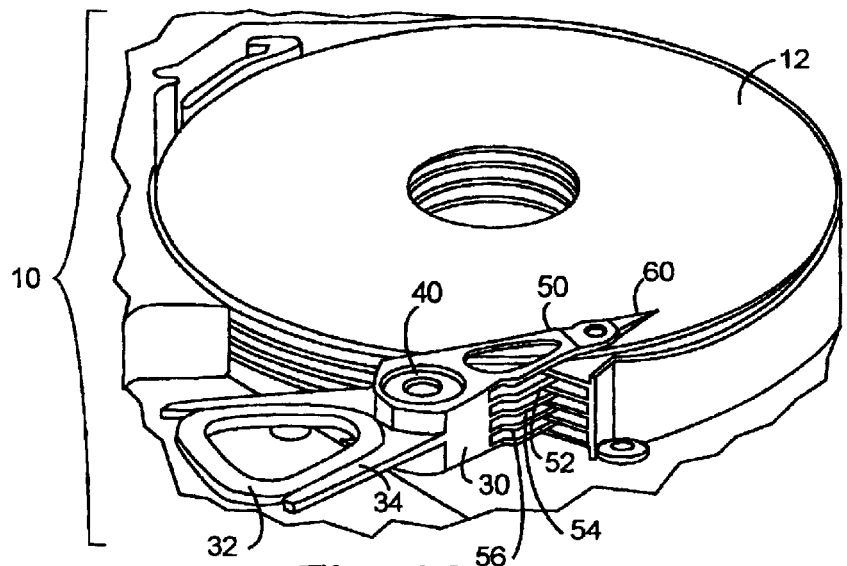
FIG. 1A illustrates a typical prior art high capacity disk drive 10 including actuator 30 with voice coil 32, actuator axis 40, actuator arms 50–58 with head gimbal assembly 60 placed among the disks.
Figure 1B:
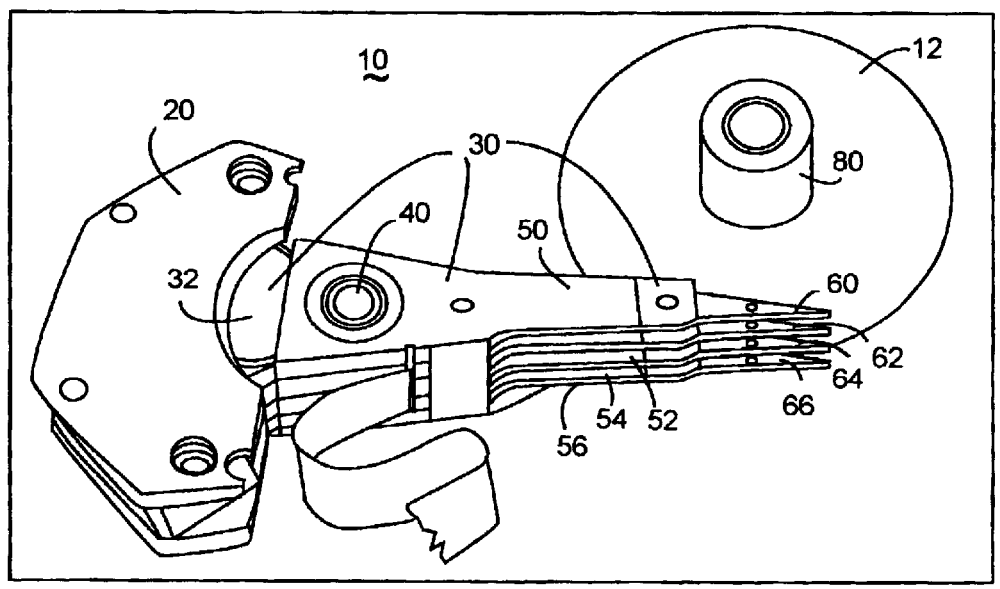
FIG. 1B illustrates a typical prior art high capacity disk drive 10 with head stack assembly 20 including actuator 30 with voice coil 32, actuator axis 40, actuator arms 50–56 and head gimbal assemblies 60–66 with the disks removed.
Figure 2A:
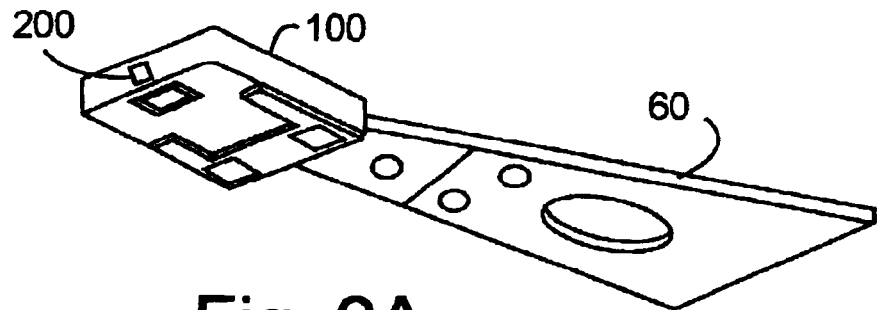
FIG. 2A illustrates a head gimbal assembly including head suspension assembly 60 with head slider 100 containing the read-write head 200 of the prior art.
Figure 2B:
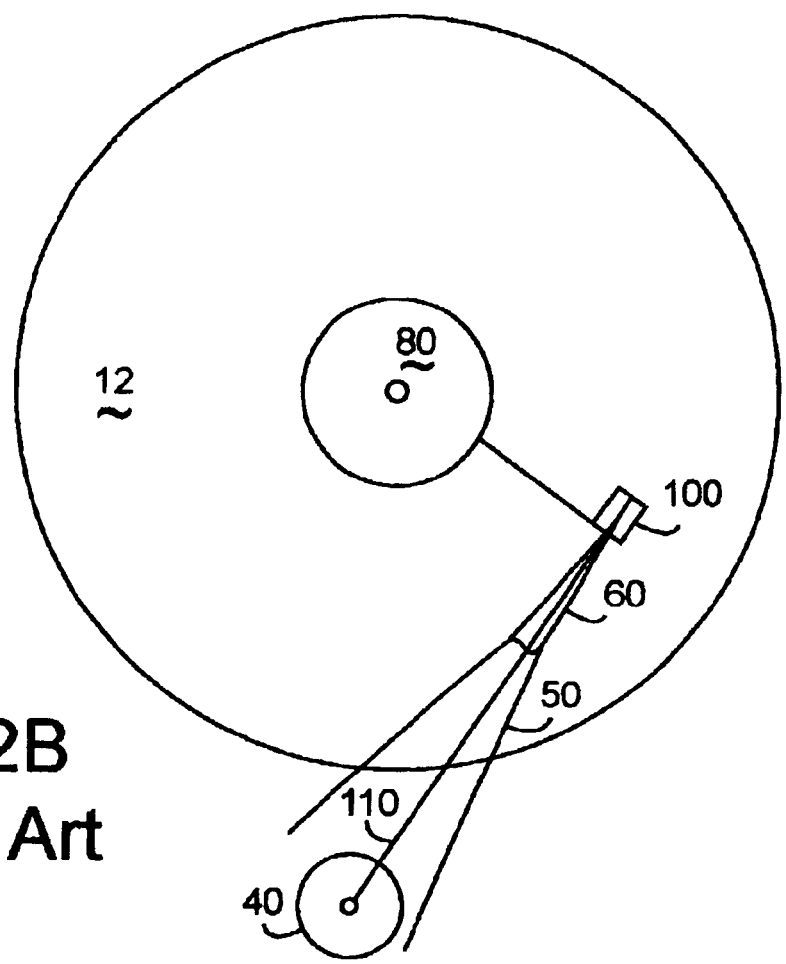
FIG. 2B illustrates the relationship between the principal axis 110 of an actuator arm 50 containing head gimbal assembly 60, which in turn contains slider 100, as found in the prior art.
Figure 2C:
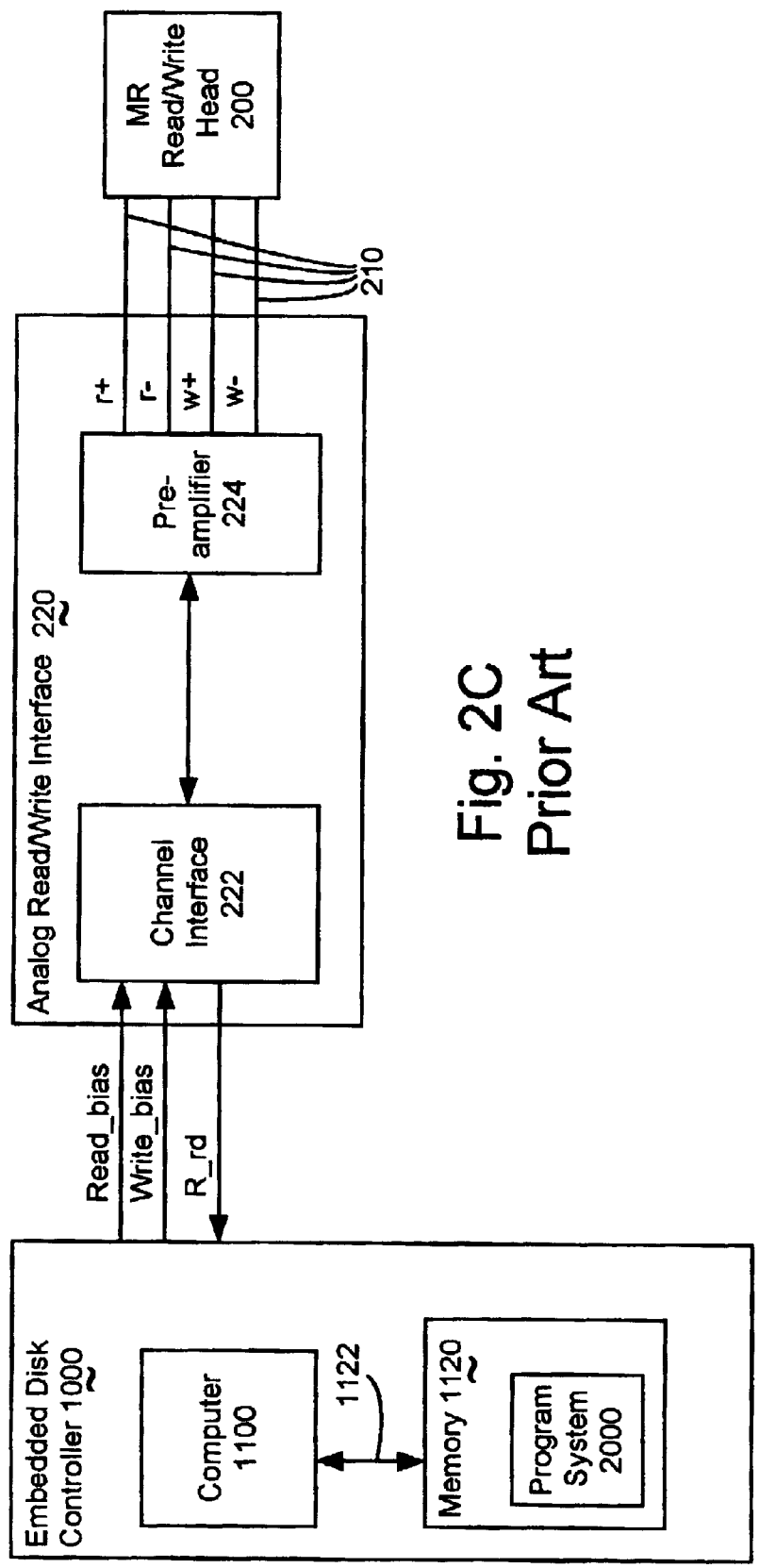
FIG. 2C illustrates a simplified schematic of a disk drive controller 1000 of the prior art.
Figure 2D:
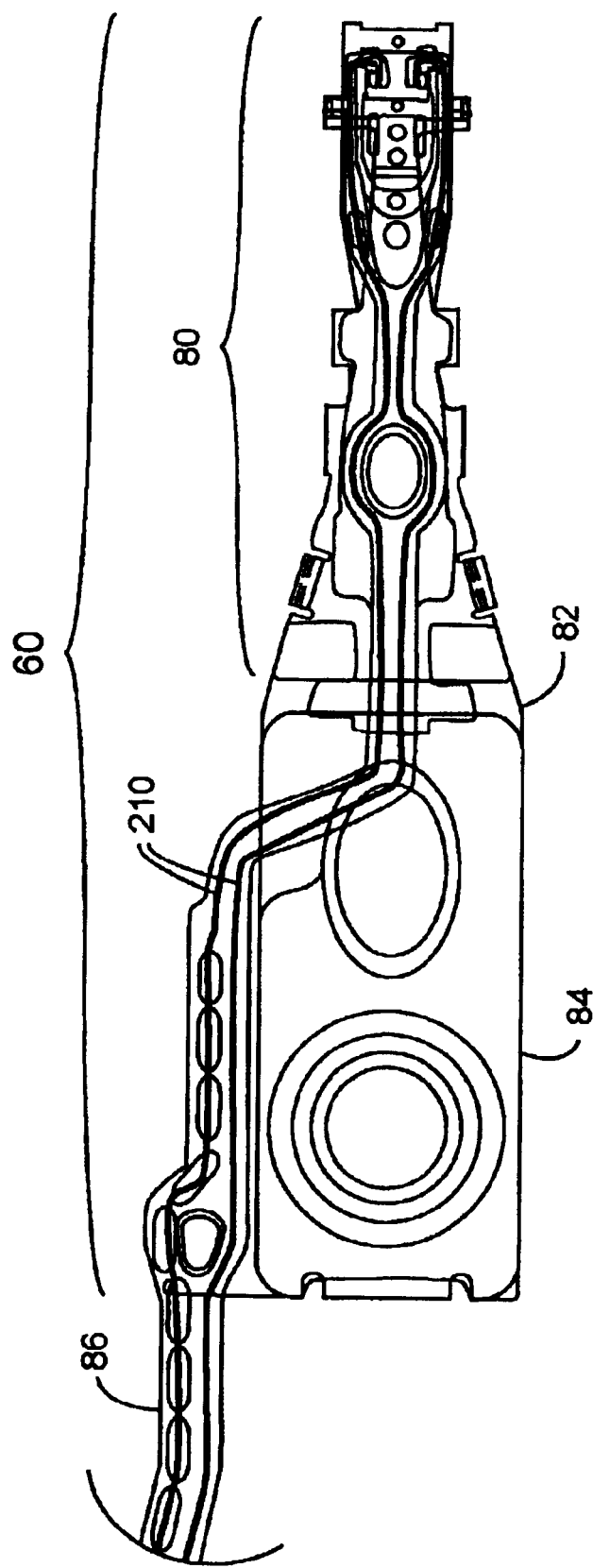
FIG. 2D illustrates a detailed view head suspension 60 of the prior art.
Figure 3:
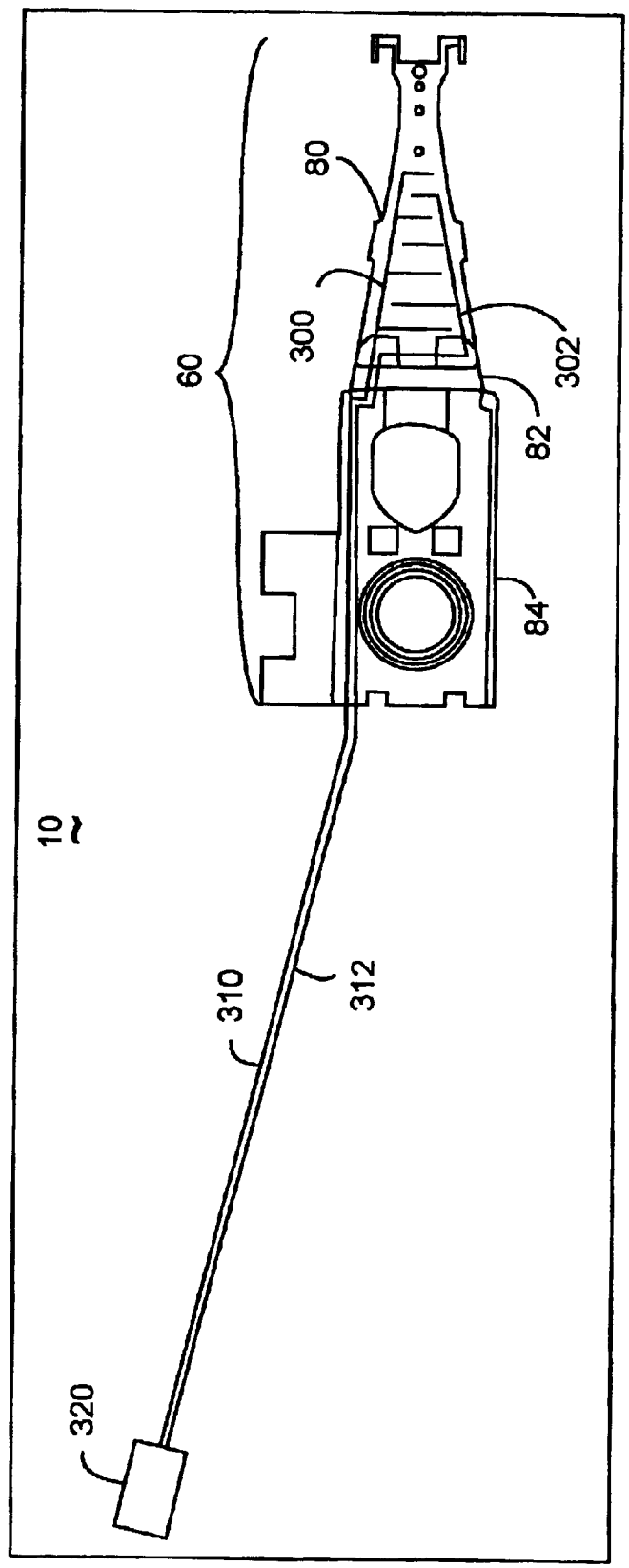
FIG. 3 illustrates a head suspension 60, including a load suspension beam 80, with two integrated piezo fiber elements 300 and 302, providing signals to conductors 310 and 312 to a means 320, which are collectively included in disk drive 10.

FIG. 3 illustrates a head suspension 60, including a load suspension beam 80, with two integrated piezo fiber elements 300 and 302, providing signals to conductors 310 and 312 to a means 320, which are collectively included in disk drive 10.

The load suspension beam 80 operates as follows. At least two differential signals are provided from the suspension load beam 80 indicating mechanical bending of the suspension load beam 80. Whenever the differential signals indicate mechanical bending an out-of-phase electrical signal is sent back to the suspension load beam 80. The suspension load beam 80 responds to the out-of-phase electrical signal to attenuate the mechanical bending of the suspension load beam 80.

Load suspension beam 80 preferably includes a means for integrating at least two piezo fiber elements 300 and 302, to provide the differential signals via corresponding conductors 310 and 312, to a means 320 for response, which is preferably a control circuit 320. The control circuit 320 preferably uses a standby power supply 322 when disk drive 10 is not in operation.

The preferred suspension load beam 80 integrates the piezo fiber elements 300 and 302, capable of sensing mechanical bending in the suspension load beam 80, as well as responding to the out-of-phase electrical signal(s) to contract, dampening or attenuating the mechanical bending through their contraction.

The invention includes head gimbal assemblies comprising head suspension 60 made with suspension load beams 80, as well as actuators including these head gimbal assemblies, and disk drives including these actuators.

The disk drive as a whole preferably includes the following. A means for at least two piezo fiber elements 300 and 302 integrated into a suspension load beam 80 collectively providing at least two differential signals, each via a corresponding conductor 310 and 312, indicating a mechanical bending of suspension load beam 80. A means for responding 320 to the differential signals received via the corresponding conductors 310 and 312 whenever mechanical bending is indicated, by sending an out-of-phase electrical signal back via conductors 310 and 312 to suspension load beam 80. And a means for at least two of the piezo fiber elements 300 and 302 integrated into the suspension load beam 80 responding to the out-of-phase electrical signal to attenuate the mechanical bending of the suspension load beam 80.

Figure 4:
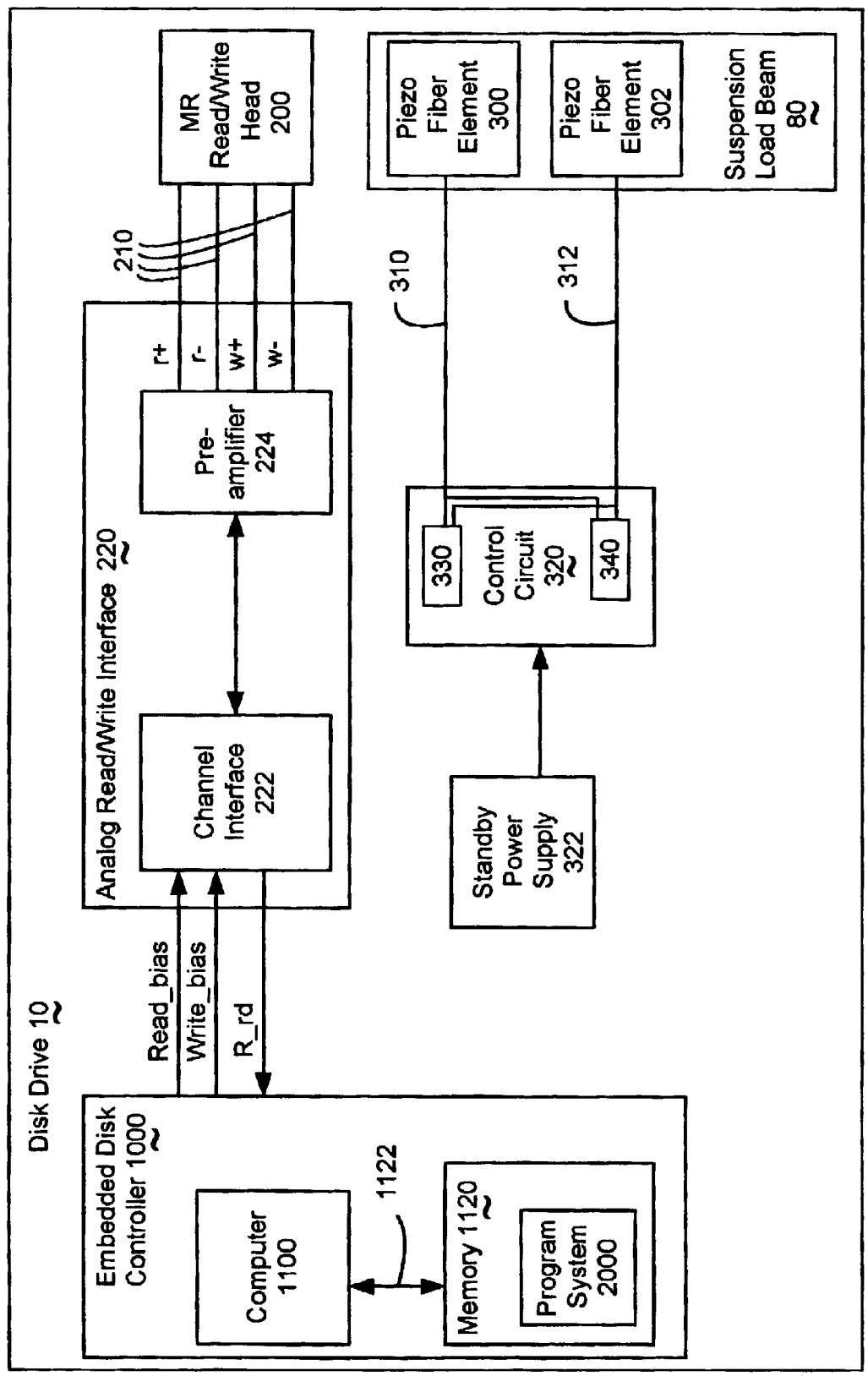
FIG. 4 illustrates a simplified block diagram of a suspension load beam 80, integrating two piezo fiber elements 300 and 302, communicating via conductors 310 and 312, respectively, with control circuit 320, as the means for responding to the differential signals from suspension load beam 80 in disk drive 10.

FIG. 4 illustrates a simplified block diagram of a suspension load beam 80 integrating two piezo fiber elements 300 and 302, communicating via conductors 310 and 312, respectively, with control circuit 320, as the means for responding to the differential signals from suspension load beam 80 in disk drive 10.

Note that the invention contemplates the use of more than two piezo fiber elements, including the possibility of at least partially distinct use of piezo fiber elements between sensing mechanical bending, and responding to the out-of-phase electrical signal to attenuate the mechanical bending of the suspension load beam 80.

Control circuit 320 is preferably coupled to a standby power supply 322, to enable operation while the disk controller 1000 is non-operational. In certain cases, the standby power supply may include, one or a combination of, electrical batteries and fuel cells.

Means 320 of either FIGS. 3 and 4, may further include means 330 for sensing the differential signals to generate at least one feedback indication 332 and means 340 for generating the out-of-phase electrical signal based upon the feedback indication 332, as illustrated in FIG. 4.

Either of the means 330 and 340 may use at least one analog or digital circuit element.

An analog circuit element includes at least one member of an analog circuit type collection comprising an amplifier, an op-amp, a comparator, a differential amplifier, an analog-to-digital converter, a digital-to-analog converter, a phase-locked-loop, an oscillator, a standby power supply, and a filter.

A digital circuit element includes at least one member of a digital circuit type collection comprising a memory, a computer, a synchronous logic circuit, an asynchronous logic circuit, and a self-timed logic circuit. Note that the computer may in certain instances be computer 1100, but it will often be preferable to use a separate computer consuming less power than computer 1100, with its associated memory 1120.

The feedback indication includes at least one of a bending indication, a bending threshold indication, a bending rate indication, and a bending rate threshold indication.

The preceding embodiments have been provided by way of example and are not meant to constrain the scope of the following claims.

What is claimed is:

1. A disk drive, comprising:

means for at least two piezo fiber elements integrated into a suspension load beam collectively providing at least two differential signals, each via a corresponding conductor, indicating a mechanical bending of said suspension load beam;

means for responding to said differential signals received via said corresponding conductors whenever indicating mechanical bending by sending an out-of-phase electrical signal back via said corresponding conductors to said suspension load beam;

means for at least two of said piezo fiber elements integrated into said suspension load beam responding to said out-of-phase electrical signal to attenuate said mechanical bending of said suspension load beam.

2. The apparatus of claim 1, wherein the means responding to said differential signals is further comprised of:

means for sensing said differential signals to generate at least one feedback indication; and means for generating said out-of-phase electrical signal based upon said feedback indication.

3. The apparatus of claim 2, wherein at least one of the means of claim 2 uses at least one member of a collection comprising an analog circuit element and a digital circuit element;

wherein said analog circuit element includes at least one member of an analog circuit type collection comprising an amplifier, an op-amp, a comparator, a differential amplifier, an analog-to-digital converter, a digital-to-analog converter, a phase-locked-loop, an oscillator, a standby power supply, and a filter;

wherein said digital circuit element includes at least one member of a digital circuit type collection comprising a memory, a computer, a synchronous logic circuit, an asynchronous logic circuit, and a self-timed logic circuit.

4. The apparatus of claim 2, wherein said feedback indication includes at least one member of the collection comprising: a bending indication, a bending threshold indication, a bending rate indication, and a bending rate threshold indication.

5. A suspension load beam, comprising:

at least two piezo fiber elements collectively providing at least two differential signals, each upon a corresponding conductor;

wherein said piezo fibers respond to mechanical bending of said suspension load beam to generate a current between said differential signals via said corresponding conductors; and wherein said piezo fiber elements respond to an out-of-phase signal received via said corresponding conductors by contracting, mechanically attenuating said head suspension vibration inducing said bending.

6. A head suspension assembly, comprising: at least one of said suspension load beams of claim 5.

7. A head gimbal assembly, comprising: at least one head suspension assembly of claim 6.

8. An actuator, comprising: at least one head gimbal assembly of claim 7.

9. A disk drive, comprising:
at least one suspension load beam of claim 5 providing said differential signals to said corresponding conductors communicating with a control circuit;
said control circuit senses said differential signals provided by said corresponding conductors by sending an out-of-phase electrical signal back via said corresponding conductors to said piezo fiber elements.

10. The apparatus of claim 9, wherein said control circuit is comprised of:
means for sensing said differential signals provided by said corresponding conductors to generate at least one feedback indication; and
means for generating said out-of-phase electrical signal based upon said feedback indication back via said corresponding conductors to said piezo fiber elements.

11. The apparatus of claim 10,
wherein at least one of the means of claim 10 uses at least one member of a collection comprising an analog circuit element and a digital circuit element;
wherein said analog circuit element includes at least one member of an analog circuit type collection comprising an amplifier, an op-amp, a comparator, a differential amplifier, an analog-to-digital converter, a digital-to-analog converter, a phase-locked-loop, an oscillator, a standby power supply, and a filter;
wherein said digital circuit element includes at least one member of a digital circuit type collection comprising a memory, a computer, a synchronous logic circuit, an asynchronous logic circuit, and a self-timed logic circuit.

12. A method of operating a load suspension beam in a disk drive, comprising the steps of:
providing at least two differential signals, each via a corresponding conductor, from said suspension load beam indicating mechanical bending of said suspension load beam;
responding to said differential signals whenever indicating mechanical bending by sending an out-of-phase electrical signal back to said suspension load beam, via said corresponding conductors; and
said suspension load beam responding to said out-of-phase electrical signal to attenuate said mechanical bending of said suspension load beam.

13. The method of claim 12,
wherein the step responding to said differential signals is further comprised of the steps of:
sensing said differential signals to generate at least one feedback indication; and
generating said out-of-phase electrical signal based upon said feedback indication.

14. The method of claim 13,
wherein said feedback indication includes at least one member of the collection comprising: a bending indication, a bending threshold indication, a bending rate indication, and a bending rate threshold indication.

15. The method of claim 12,
wherein the step responding to said differential signals is further comprised of the step of:
responding to said differential signals received via said corresponding conductors whenever indicating mechanical bending by sending said out-of-phase electrical signal back via said corresponding conductors to said suspension load beam;
wherein the step said suspension load beam responding to said out-of-phase electrical signal is further comprised of the step of:
said suspension load beam responding to said out-of-phase electrical signal via said corresponding conductors to attenuate said mechanical bending of said suspension load beam.

16. A load suspension beam for a disk drive, comprising:
means for providing at least two differential signals, each via a corresponding conductor, from said suspension load beam indicating a mechanical bending of said suspension load beam; and
means for said suspension load beam responding to an out-of-phase electrical signal from said corresponding conductors to attenuate said mechanical bending of said suspension load beam.

17. A disk drive, comprising:
said load suspension beam of claim 16, and
means for responding to said differential signals whenever indicating said mechanical bending by sending said out-of-phase electrical signal back to said suspension load beam.

18. The apparatus of claim 17,
wherein the means responding to said differential signals is further comprised of:
means for sensing said differential signals to generate at least one feedback indication; and
means for generating said out-of-phase electrical signal based upon said feedback indication.

19. The apparatus of claim 18,
wherein at least one of the means of claim 18 uses at least one member of a collection comprising an analog circuit element and a digital circuit element;
wherein said analog circuit element includes at least one member of an analog circuit type collection comprising an amplifier, an op-amp, a comparator, a differential amplifier, an analog-to-digital converter, a digital-to-analog converter, a phase-locked-loop, an oscillator, a standby power supply, and a filter;
wherein said digital circuit element includes at least one member of a digital circuit type collection comprising a memory, a computer, a synchronous logic circuit, an asynchronous logic circuit, and a self-timed logic circuit.

20. The apparatus of claim 18,
wherein said feedback indication includes at least one member of the collection comprising: a bending indication, a bending threshold indication, a bending rate indication, and a bending rate threshold indication.

21. The apparatus of claim 17,
wherein the means responding to said differential signals is further comprised of:
means for responding to said differential signals received via said corresponding conductors whenever indicating mechanical bending by sending said out-of-phase electrical signal back to said suspension load beam.

22. The apparatus of claim 21,
wherein the means responding to said differential signals is further comprised of:

means for responding to said differential signals received via said corresponding conductors whenever indicating mechanical bending by sending said out-of-phase electrical signal back via said corresponding conductors to said suspension load beam.

23. The apparatus of claim 16, wherein the means for providing at least two differential signals is further comprised of:

means for at least two piezo fiber elements integrated into said suspension load beam collectively providing said differential signals indicating said mechanical bending of said suspension load beam.

24. The apparatus of claim 16, wherein the means for said suspension load beam responding is further comprised of:

means for at least two piezo fiber elements integrated into said suspension load beam responding to said out-of-phase electrical signal to attenuate said mechanical bending of said suspension load beam.

25. A head suspension assembly, comprising said load suspension beam of claim 16.

26. A head gimbal assembly, comprising said head suspension assembly of claim 25.

27. An actuator, comprising at least one of said head gimbal assemblies of claim 26.

* * * * *